(12) United States Patent
Nolan (10) Patent No.: US 6,211,962 B1
(45) Date of Patent: Apr. 3, 2001

(54) SENSOR APPARATUS WITH POLARIZATION MAINTAINING FIBERS

(75) Inventor: Daniel A. Nolan, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/284,371

(22) PCT Filed: Sep. 25, 1997

(86) PCT No.: PCT/US97/17494

§ 371 Date: Apr. 14, 1999

§ 102(e) Date: Apr. 14, 1999

(87) PCT Pub. No.: WO98/15856

PCT Pub. Date: Apr. 16, 1998

Related U.S. Application Data (60) Provisional application No. 60/027,684, filed on Oct. 7, 1996.

(51) Int. Cl.[7] .................. G01B 9/02; G01B 6/00
(52) U.S. Cl. ................ 356/450; 385/12
(58) Field of Search .............. 356/345; 385/11, 385/12, 9, 13, 31, 123, 126, 127, 128; 250/227.18, 227.17

(56) References Cited

U.S. PATENT DOCUMENTS

| | | | |
|---|---|---|---|
| 5,553,173 | * | 9/1996 | Lutz et al. .................. 382/12 |
| 5,822,487 | * | 10/1998 | Evans et al. ................ 385/123 |
| 5,943,466 | * | 8/1999 | Henderson et al. .......... 385/123 |

* cited by examiner

*Primary Examiner*—Frank G. Font
*Assistant Examiner*—Phil Natividad
(74) *Attorney, Agent, or Firm*—William J. Chervenak (57) ABSTRACT

A distributed sensor (10) includes a plurality of stages (24, 28, 32, 36, 40) connected in series, each stage incorporating a length of polarization maintaining fiber (12) exposed to a phenomena such as mechanical deformation or temperature to be sensed. Inter-mode couplers are provided between the sensing fibers (26, 30, 34, 38) of the various stages. The overall transfer function of the device at a plurality of wavelengths is deconvoluted to determine the birefringence of each sensing region and does monitor plural phenomena independently of one another.

35 Claims, 4 Drawing Sheets

SENSOR APPARATUS WITH POLARIZATION MAINTAINING FIBERS

This is a 371 of PCT/US97/17494 filed Sep. 25, 1997, and also claim the benefit of Provisional Ser. No. 60/027,684, filed Oct. 7, 1996.

BACKGROUND OF THE INVENTION

The present invention relates to the field of sensors and transducers, and more particularly relates sensors and transducers utilizing optical fibers as sensing elements.

Transducers are devices which provide a signal representing a phenomenon to be sensed. Common transducers include thermistors and thermoresistors which convert temperature to electrical signals and electrical strain gauges which can be attached to an object and which convert deformation of the object into electrical signals. In various applications, it would be desirable to use optical transducers which convert the phenomenon to be sensed, such as temperature, mechanical strain or pressure, into an optical signal such as a change in the properties of light passing along an optical fiber.

Optical signals can be communicated over considerable distances through fiber optics. It would be desirable to provide sensors which can be conveniently integrated with fiber optic systems. Because fiber optics are of small diameter, an optical sensor which can be integrated with a fiber can be placed readily in an environment having restricted accessibility such as within the interior of a machine or structure. For example, an optical strain gauge sensitive to deformation can be embedded in an object such as a structural member and used to monitor deformation of the object.

There has been a particular need for optical sensing assemblies which can monitor phenomena occurring at several locations. For example, it is often desirable to monitor the deformation of a structural member at numerous locations within the structural member, or to monitor temperature at various points in a room or in an industrial system. It would be desirable to provide monitoring at numerous points without the need for a separate communications channel extending to each point.

Various approaches have been proposed for making optical sensors. Wong et al., Truly Form Birefringent Fibres, *Integrated Photonics Research*, Post Deadline Papers, 1992, pp. 52–55; Kecuchi et al., Polarimetric Strain and Pressure Sensors Using Temperature-Independent Polarization Maintaining Optical Fibre, *Proc. 2nd International Conference Ofs.*, pp. 395–398 (1984); Dakin et al., Compensated Polarimetric Sensor Using Polarization Maintaining Fibre In A Differential Configuration, *Electronics Letters*, Vol. 20, No. 1, pp. 51–53 (1984); and Lefevre et al., Optical Fiber Hydrophone and Antenna Associating A Series Of Hydrophones, U.S. Pat. No. 4,882,716, all discuss optical fiber sensors using a special form of optical fiber known as a polarization maintaining fiber as a sensitive element.

A polarization maintaining optical fiber has different propagation constants for light having different polarizations. The term "propagation constant" refers to a measure of the speed with which a light propagates along a path such as a fiber. The propagation constant is also a measure of the wavelength of the light propagating along the path. Propagation constant is commonly denoted by the symbol $\beta$. A typical optical fiber includes a core of glass and a cladding formed from glass having different optical properties than the core. The propagation constant of light passing through an optical fiber depends upon the diameter of the core, the indices of refraction of the core and cladding and the wavelength of the light. In one type of polarization maintaining fiber, the core is of a non-circular shape such as an elliptical shape, so that the core has different diameters along different axes transverse to the length of the fiber. The fiber thus has a greater propagation constant for light having its electric field direction aligned with one such axis (the "fast axis") and has a lesser propagation constant for light having an electric field direction aligned with the other axis ("the slow axis"). Other polarization maintaining fibers include features which maintain the core under different stress conditions along fast and slow axes, and thus maintain different indices of refraction for light having field directions aligned with the fast and slow axes. Light having its field direction aligned with the fast axis is said to propagate in the fast polarization mode of the fiber, whereas light having its field direction aligned with the slow axis is said to propagate in the slow polarization mode of the fiber.

In optical fiber sensors as disclosed, for example, in the '716 patent, light is launched into a length of polarization maintaining fiber with the polarization of the light at 45° to the slow and fast axes. The light thus includes components along both axes, propagating in both fast and slow modes. The components propagate at different velocities. Consequently, at the downstream end of the fiber, the components differ in phase from one another. When the components at the downstream end of the fiber interfere with one another, the amplitude or power in the resulting light vanes with the phase difference. The phase difference, in turn, depends upon the difference between the propagation constants for the fast axis and the slow axis and upon the length of the fiber. The phase difference changes in response to stress in the fiber and therefore changes in response to an acoustical field impinging on the fiber.

The '716 patent uses an additional polarization maintaining fiber, referred to as a "compensation fiber" which is not subjected to the acoustical field to be sensed. The compensation fiber has its fast and slow axes disposed at 90° to those of the sensing fiber, so that light aligned with the slow axis of the compensation fiber will be aligned with the fast axis of the sensing fiber and vice versa Changes in the phase difference caused by the effect of temperature on the compensation fiber and on the sensing fiber will cancel one another. As also taught in the '716 patent, plural sensing fibers can be connected in parallel to one another. Such an arrangement requires a complex array of fibers and couplers to direct the light along numerous parallel paths and recombine the light from all of the paths into a common return path. This system also depends on the differences between the lengths of the paths to segregate the signals transmitted along different paths. It requires a pulsed light source and equipment for sorting pulses returned through the common return path according to the times at which the pulses are returned.

It would be desirable to provide a simple optical sensing system capable of sensing a plurality of phenomena, without these complexities in the optical components.

SUMMARY OF THE INVENTION

The present invention addresses these needs.

One aspect of the present invention provides optical sensing apparatus for sensing a plurality of phenomena. The apparatus includes a plurality of stages connected in series order from a first stage to a last stage. Each stage includes a polarization maintaining sensing fiber having different propagation constants for light in first and second polarization modes. Each sensing fiber has input and output ends. Each stage also includes launching means for launching light in both polarization modes of the sensing fiber into the sensing fiber at the input end, so that light will propagate in both polarization modes to the output end of the sensing fiber. Each stage further includes combining means for combining the light propagated to the output end of the sensing fiber in both polarization modes into one or more common polarization modes. Thus, the amplitude of the combined light will vary with the phase relationship between the light propagated in the first and second mode polarization modes at the output end of the sensing fiber. Each stage further includes exposure means for mounting the sensing fiber so that the sensing fiber is exposed to a phenomenon to be sensed and so that such phenomenon will alter the length of the sensing fiber; the difference between the propagation constants of the sensing fiber or both Thus, the phase relationship between polarization modes and hence the amplitude of the combined light will vary with the phenomenon to be sensed. The combining means of each stage other than he last stage is connected to the launching means of the next stage in the series so that combined light from each stage other than the last stage in the series will be launched into the sensing fiber of the next stage in the series.

The launching means, combining means, and sensing fibers of all of the stages may be formed as sections of polarization maintaining fiber connected end to end so that the fast and slow axes of the various sections are disposed at different orientations. The sections may be joined by splices. More preferably, however, the launching means, combining means, and sensing fibers are formed as sections of a single continuous polarization maintaining fiber. The launching means and the combining means preferably include spin sections of the fiber, in which the spin rate varies along the length of the fiber. As further discussed below, the term "spin rate" refers to the rate at which the orientation of the fast and slow axes changes gradually along the length of the fiber.

The apparatus desirably includes light supply means for supplying light at a plurality of wavelengths to the input means of the first stage in the series; means for detecting the amplitude of the combined light provided by the combining means of the last stage and means for actuating the light supply means and the detecting means to provide data constituting a plot of detected amplitude versus the wavelength of the supplied light. The data thus represents a plot of the transfer function of the series of stages in combination. The apparatus may further include means for deconvoluting the data so as to derive a separate measurement of the phenomenon sensed by each stage. As further described below, the amplitude of the combined light provided by the combing means of the last stage in the series is influenced by all of the phenomena sensed by all of the stages. However, when the light supplied through the series of stages includes a plurality of wavelengths, the effects caused by the different sensing fibers can be evaluated separately so as to give separate data about the phenomenon sensed by each sensing fiber. Preferably, the combining means of the different stages are arranged to provide different degrees of coupling between polarization modes. Most preferably, the degree of coupling provided by the combining means varies monotonically from the combining means of the first stage, following the first sensing section, to the combining means of the last stage, following the last sensing section. As further described below, the different degrees of mode coupling aid in deconvoluting the effects imparted by different sensing sections.

The preferred apparatus according to this aspect of the present invention incorporates simple optical components, which can be fabricated readily and reliably at low cost. The apparatus can be used to sense phenomena of the same type or different types. For example, the various sensing fibers can be attached to various portions of an object, as by embedding the sensing fibers in the object at various locations so as to sense so in the object at all of these locations. Alternatively, the various sensing fibers may be exposed to the temperatures prevailing at various locations in an industrial process or in a building so as to sense all of these temperatures simultaneously.

In a preferred arrangement, the means for detecting amplitude includes a polarization-maintaining output fiber connected to the combining means of the last stage, a polarizing filter connected to said output fiber and a detector arranged to detect light passing through said filter. The launching means of the first stage may include a polarization-maintaining input fiber having an input end and an output end coupled to the input end of the sensing fiber of the first stage so that light supplied in one polarization along the input fiber will be coupled from the input fiber into both polarization modes in the sensing fiber of the first stage. A light source may be arranged to provide light in only one polarization to the input end of said input fiber.

In a variant of the apparatus, a mirror may be connected to the combining means of the last stage for reflecting light back through the stages in reverse sequence from the last stage to the first stage. In this variant, the combining means and the launching means of each said stage are bi-directional Thus, the combining means of each stage serves as launching means for launching reflected light in both polarization modes of the sensing fiber of such stage into the fiber at the output end thereof, whereas the launching means of each stage serves to combine reflected light propagated to the input end of the sensing fiber in both of such polarization modes into one or more common polarization modes.

Most preferably, apparatus according to this variant includes a polarizing filter connected between the mirror and the combining means of the last stage. The launching means of the first stage may include a polarization-maintaining input fiber coupled to the input end of the sensing fiber of the first stage by a splice or spin section, and a light source connected to the input end of the input fiber, said light source being arranged to provide light having a first polarization to said input end of said input fiber. Apparatus according to this variant may also include a detector coupled to the input fiber for detecting reflected light, said detector being arranged to detect light having a second polarization orthogonal to the first polarization. For example, both the light source and the detector may be connected to the input fiber by a polarization-dependent splitter. Apparatus according to this variant operates in much the same way as the apparatus mentioned above, except that the light is detected after passing through the sensing sections in both directions, rather than in only one direction.

Yet another aspect of the invention provides a unitary polarization-maintaining fiber including a polarization-maintaining sensing section having a uniform spin rate and having different propagation constants for light in first and second polarization modes, the sensing section having input and output ends, the unitary fiber further including first and second spin sections in which the spin rate vanes along the length of the fiber connected to the input end and the output end of said sensing section, respectively. Preferably, the unitary fiber includes a plurality of such sensing sections and at least three spin sections, the spin sections and sensing sections being arranged in alternating sequence along the length of the fiber. Fibers according to this aspect of the invention may be used in sensing apparatus as discussed above. Thus, such a fiber may be combined with exposure means for mounting the fiber so that each sensing section is exposed to a phenomenon to be sensed.

Further aspects of the present invention provide methods of sensing plural phenomena Methods according to this aspect of the present invention desirably include the step of directing light at a plurality of wavelengths through a series of stages, each including a polarization maintaining sensing fiber and a combiner for combining light propagated to an output end of the sensing fiber in both polarization modes into combined light in one or more common modes. Thus, the light is launched into the sensing fiber of the first stage in both polarization modes and combined light from each stage is launched into the sensing fiber of the next stage in both polarization modes This process continues until the light reaches the combiner of the last stage. The method further includes the step of exposing the sensing fiber of each stage to a phenomenon to be sensed so that the phenomenon will alter the length of the sensing fiber, the difference between the propagation constants of the fiber or both The method desirably includes the step of detecting the amplitude of the combined light from the last stage and collecting data constituting a plot of this amplitude versus wavelength, i.e., the amplitude of the combined light of each wavelength versus the wavelength and then deconvoluting the combined light signal so as to derive a separate measurement of the phenomenon sensed by the sensing fiber of each stage. The method affords advantages similar to those discussed above in connection with the apparatus.

These and other objects, features, and advantages of the present invention will be more readily apparently from the detailed description of the preferred embodiments set forth below, taken in conjunction with the accompanying drawings.

DETAILED DESCRIPTION OF THE PREFERRED EMBODIMENTS

Figures 1, 2:
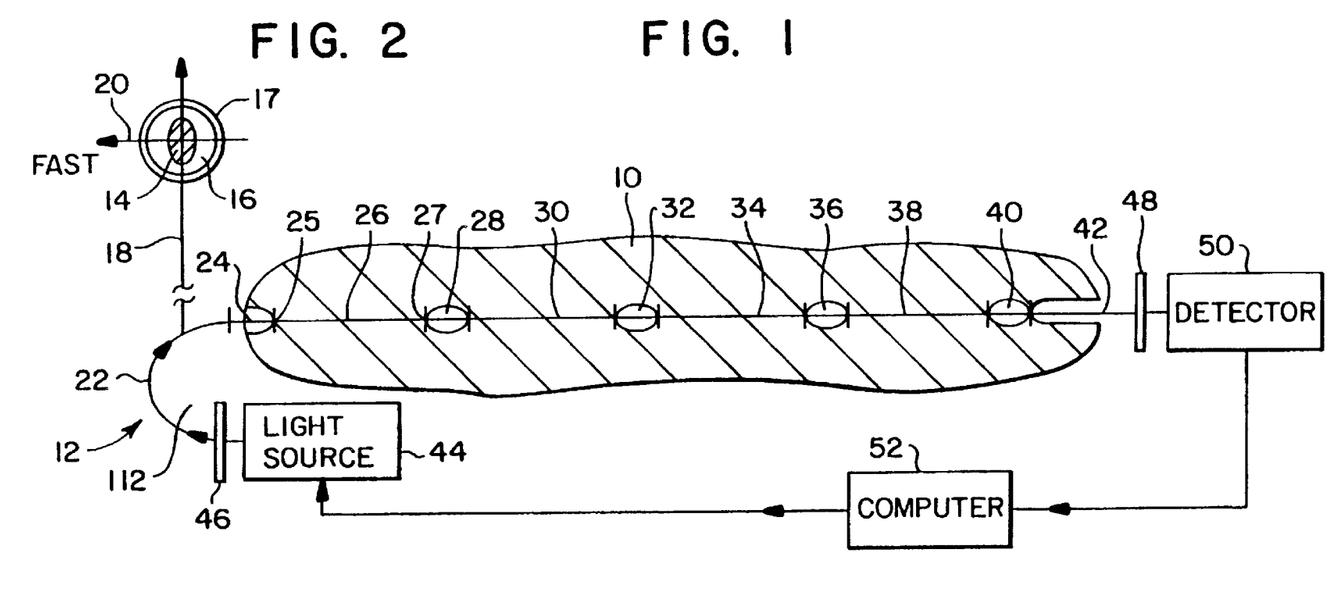
FIG. 1 is a diagrammatic view depicting apparatus in accordance with one embodiment of the invention.
FIG. 2 is a cross-sectional view of a fiber used in the apparatus of FIG. 1.

Apparatus in accordance with one embodiment of the invention is arranged to monitor deformation of an object such as a structural member 10 at various locations within the object The apparatus includes a single continuous measuring fiber 12. Fiber 12 is a polarization maintaining fiber having a core 14 surrounded by a cladding 16, which in turn is surrounded by a coating 17. The core and cladding are both formed from glass, the core having a slightly higher refractive index than the cladding. Coating 17 is formed from a polymeric material adapted to protect the cladding from mechanical damage. Core 14 has a non-circular shape, in this case an elliptical shape with a major axis 18 and a minor axis 20 perpendicular to the long axis as seen in cross section (FIG. 2) perpendicular to the length of the fiber As used herein, the term "major diameter" refers to the diameter along the major axis and hence to the maximum cross-sectional dimension of the core whereas the term "minor diameter" refers to the dimension along the minor axis 20 and hence refers to the smallest cross-sectional dimension of the core. Both the major and minor diameters are smaller than the maximum diameter for single mode propagation at all wavelengths to be employed in the system. That is:

$$\frac{d}{\lambda} < \frac{2.405}{2\pi\sqrt{n_1^2 - n_2^2}} \tag{1}$$

where:

$d$    is the major diameter ($d_{major}$) or the minor diameter ($d_{minor}$) of the fiber;

$\lambda$    is the wavelength of light propagated along the fiber;

$n_1$    is the refractive index of the core; and $n_2$    is the refractive index of the cladding.

Measuring fiber 12 includes an input section 22 and a plurality of spin sections 24, 28, 32, 36 and 40, arranged in alternating sequence with a plurality of sensing sections 26, 30, 34 and 38. Thus, an upstream or input end of sensing section 26 is coupled to the input fiber 22 through the first spin section 24, whereas the downstream or output end of the first sensing section 26 is connected to the upstream or input end of the second sensing section 30 through the second spin section 28 and so on through the last sensing section 38. The last sensing section is connected to output section 42 by the last spin section 40. Within each sensing section 26, 30, 34 and 38, the rate of change in the orientation of the major and minor axes 18 and 20 of the fiber per unit length along the fiber, commonly referred to as the "spin rate", remains substantially constant along the lengthwise extent of the fiber. The constant spin rate may be zero or non-zero. However, provided that the spin rate remains constant, there will be little or no mode coupling or transfer of power between polarization modes in the sensing section. Similarly, the spin rate is substantially constant within the input section 22 and within the output section 42 of the fiber. However, within each of the spin sections, the spin rate changes along the length of the fiber. Mode coupling occurs in regions where the spin rate changes. The degree of mode coupling, and hence the amount of optical power transferred between modes, is related to the rate of change in spin per unit length.

The direction of the change in orientation of the major and minor axes along the length of the fiber is referred to herein as the spin direction. The spin direction is also the sign of the spin rate; rotation of the major and minor axes in a clockwise direction with length along the fiber from the input end to the output end can be denoted as a positive spin rate, whereas rotation of the axes in the counterclockwise direction with length can be denoted as a negative spin rate. Preferably, each spin sections includes a pair of sections subsections having opposite spin directions. This arrangement provides a region at the juncture of the subsections where the spin rate changes rapidly. This arrangement also minimizes residual torsional stress in the fiber, and thus minimizes any tendency of the fiber to twist during handling.

The measuring fiber can be fabricated by drawing a preform having an elliptical core surrounded by a cladding and twisting the fiber intermittently during the drawing process. Apparatus for imparting spin to fibers is disclosed, for example, in commonly assigned copending U.S. Provisional patent application Ser. No. 60/015,298, filed Apr. 12, 1996, the disclosure of which is hereby incorporated by reference herein. As further discussed below, the sensing sections, input section and output section tend to maintain separation between light propagated in the fast and slow modes. However, in the spin sections 24, 28, 32, 36 and 40, there is an interchange of light between the two modes. That is, some of the light entering each spin section in the fast mode is coupled to the slow mode, and vice versa. The spin sections are arranged to provide differing degrees of mode coupling. Most preferably, the amount of mode coupling per spin section varies monotonically along the length of the device, at least from the spin section 28 following the firs sensing section 26 to the spin section 40 between the final sensing section and the output section 42. Thus, spin section 28 may be arranged to provide a relatively small amount of mode coupling, whereas spin section 30 may be arranged to provide a slightly greater amount of mode coupling, and so on up to spin section 40 which provides the greatest amount of mode coupling. The reverse arrangement, in which the amount of mode coupling per spin section decreases monotonically towards the output section is also usable. The relationships between the change in spin and degree of mode coupling are well known, and are disclosed for example, in Ulrich and Simian, Polarization Optics of Twisted Single-Mode Fibers, Applied Optics vol. 18, pp. 2241–2251 (1979) and by R. Dandliker, Rotational Effects of Polarization in Optical Fibers, in Anisotropic and Nonlinear Waveguides, by C. G. Someda and G. Stegeman, Published by Xavier, Amsterdam-London-New York-Tokyo (1992), the disclosures of which are hereby incorporated by reference herein. The first spin section 24, between the input section and the first measuring section, may provide any desired degree of coupling. It may be arranged to provide 3dB coupling, and thereby distribute optical power equally between the two modes at the input to the first measuring section.

Each of sensing sections 26, 30, 34 and 38 is embedded within the body or object 10 so that strains in the body are transmitted to the fiber in the sensing section. Thus, the sensing sections are embedded in the body, with the material of the body being in strain-transmitted contact with the coating 17 on the outside of the fiber The spin sections may be mechanically isolated from the body, as by placing each spin section within a sheath (not shown) or in an enlarged bore in the body 10 so that strains the body are not transmitted to the spin sections.

Input fiber section 22 is connected to a light source 44 through a polarizer 46. Light source 44 is adapted to provide light at any in any selected relatively narrow band of wavelengths within a preselected range of wavelengths. Preferably, light source 44 is capable of providing light in any selected band of wavelengths, with a bandwidth of about 1 nm or less, within a range of wavelengths about 50 nm or more wide. Source 44 may be a tunable source such as a tunable laser or a broadband emitter such as a lamp emitting light over the entire range of wavelengths coupled with a variable wavelength-selective device such as a variable filter, prism or grating. Output fiber 42 is connected through an analyzer 48 to a photodiode or other conventional photodetector 50. Analyzer 48 is adapted to permit passage of light in only one polarization. Detector 50 is provided with conventional amplification circuits (not shown) to provide an electrical signal representing the intensity, intensity power, of light passing through analyzer 48. Source 44 and detector 50 are linked to a control computer 52. Computer 52 includes conventional signal processing and control output components for receiving the electrical signal from detector 50 and for actuating light source 44. Computer 52 is programmed to actuate light source 44 sequentially at different wavelengths and to correlate the signal from detector 50 received during actuation at each wavelength Thus, computer 52 is arranged to compile a set of data including the optical power received by detector 50 for each wavelength within the predetermined range of actuation of light source 44.

Figure 3:
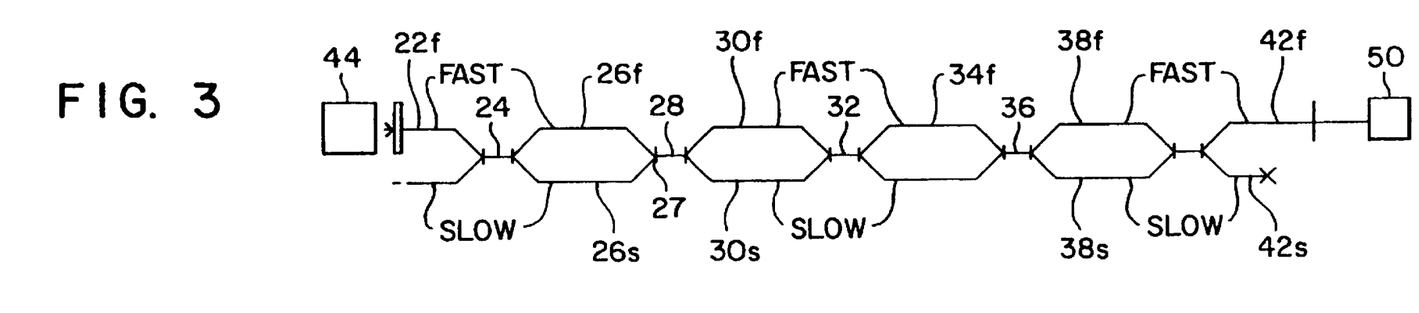
FIG. 3 is a transmission mode diagram of the apparatus depicted in FIG. 1.

The transmission paths for light in the device of FIG. 1 are schematically depicted in FIG. 3. The fast and slow modes are depicted separately in FIG. 3 in input section 22; in sensing sections 26, 30 34 and 38; and in output section 42 to indicate that there is no appreciable coupling between modes within each such section. In effect, the separate polarization modes within each of these sections constitute separate propagation paths for light passing through each such section.

Figure 4:
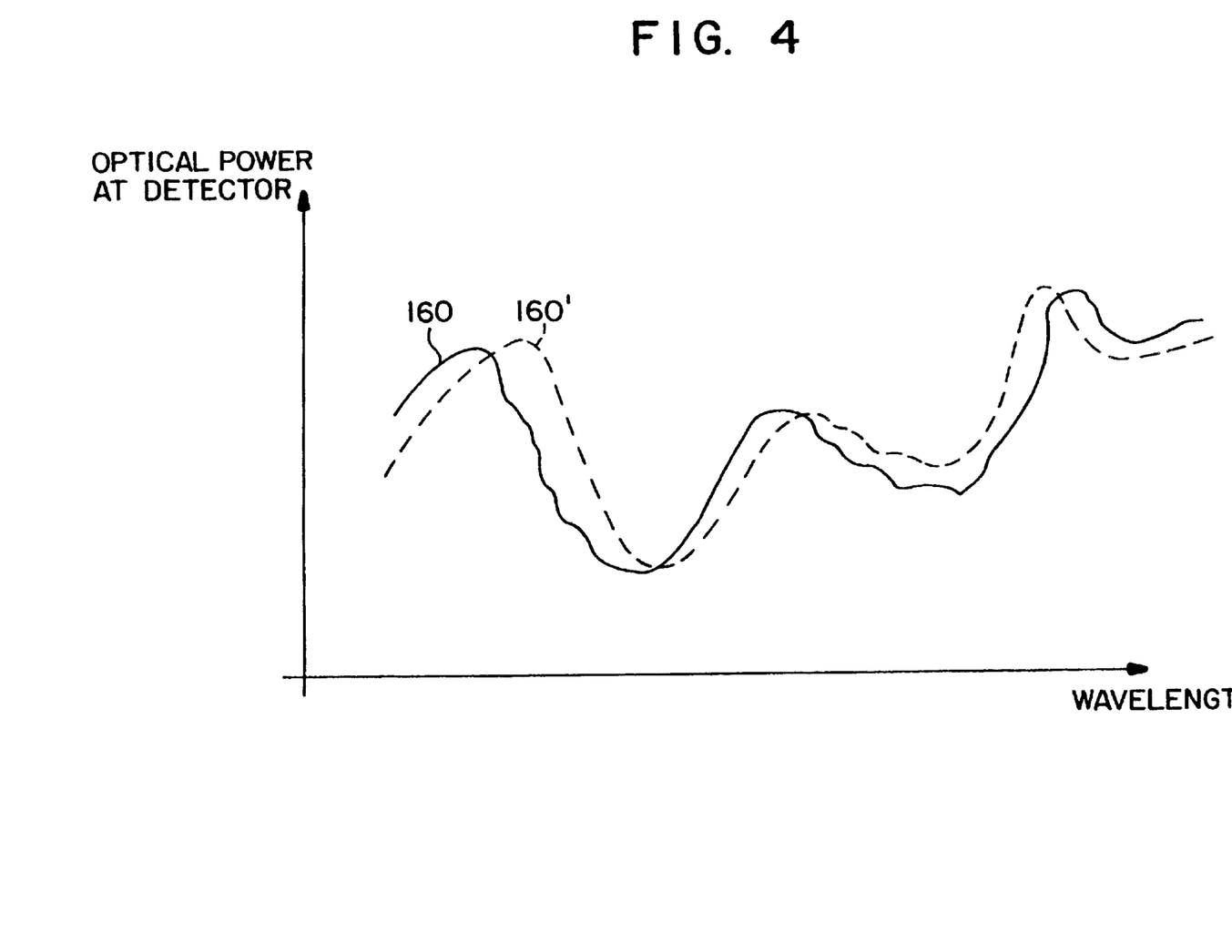
FIG. 4 is a graph of optical power versus wavelength of the type obtainable in operation of the apparatus of FIG. 1.

In operation, computer 52 actuates light source 44 to provide light at a first wavelength through polarizer 46. The light is coupled into the fast mode 22f of input fiber 22. The first spin section 24 couples the light into both the fast mode 26f and the slow mode 26s of the first sensing fiber or section 26, at the input end 25 of the sensing fiber. The light launched into both modes has the same phase at the input end of fiber 26. However, because the light propagates at different velocities in the fast and slow modes, the light reaching the output end 27 of fiber 26 through the fast mode 26f will differ in phase from the light reaching the output end through the slow mode 26s. Spin section 28 couples light between the two modes and thus combines the light propagated in both modes. That is, within spin section 28, some of the light propagated along the slow mode 26s is coupled into the fast mode and vice versa. Thus, the light passing from the spin section 28 in the fast mode of the spin section will include a combination of light propagated through slow mode 26s and fast mode 26f of the sensing section. The amplitude of this combined light will vary with the phase relationship between the light propagated by the fast mode 26f and slow mode 26s. This combined light is coupled into the fast mode 30f the second sensing fiber 30. Similarly, the light coupled into the slow mode of the fiber within spin section 28 is also a combination of the light propagated in fast mode 26f and slow mode 26s in the first sensing fiber. This combined light is coupled to the slow mode 30s of the second sensing section 30. The same process of recombination and coupling to the next fiber recurs at spin section 32 at the output end of fiber 30 and at spin section 36 at the output end of fiber 34. At the output end of the last sensing section 38, the light from both modes 38f and 38s is once again combined in spin section 40 and coupled to the two modes 42f and 42s of the output fiber section 42. Analyzer 48 is selectively operable to allow only the light from either one of the two modes, in this case fast mode 42f, to reach detector 50. Thus, while the analyzer is set to pass the light in the fast mode, the signal from detector 50 represents the amount of light coupled between the fast mode 22f of the input fiber and the fast mode 42f of the output fiber. The proportion of the light applied by source 44 which passes along the fast mode 42f varies with wavelength. Accordingly, as the wavelength applied by light source 44 is varied by computer 52, the optical power detected by detector 50 will vary. Computer 52 thus collects a combined set of data incorporating a plurality of wavelengths and the optical power received by detector 50 at each wavelength. The data for a typical plot is represented in FIG. 4. Although the data constituting the plot is shown in a conventional, visually perceptible graph in FIG. 4, it should be appreciated that the data defining such a plot typically are stored in computer memory as a series of data points, each including a wavelength and a value for optical power and hence need not be shown in a graphical form in practice. With the analyzer set to pass the light from the slow mode 42s, a similar plot is obtained. The plots in the fast and slow modes give values for power $P_{fout}$ and $P_{sout}$ in the fast and slow modes, respectively at the output end of the device at a plurality of wavelengths.

The single fiber 12 thus acts as a multi-stage matrix filter. Light is propagated through a plurality of stages, each including one sensing fiber. Within each stage, the light propagated in the fast mode shifts relative to the light propagated in the slow mode by an amount $\delta\beta$ where:

$$\Delta\Phi = \Delta\beta z = \omega\Delta\tau \quad (2)$$

where:
  $\Delta\Phi$ is the difference in phase contributed by the particular stage;
  $\Delta\beta$ is the difference between the propagation constants for light at the particular wavelength propagating in the fast and slow modes of the sensing section;
  z is the length of the sensing section;
  $\omega$ is frequency; and
  $\Delta\tau$ is the difference in time delay between light propagated through the fast and slow polarization.

The mathematical treatment applied in the paper Synthesis of a Coherent Two-Port Lattice-Form Optical Delay-Line Circuit, Jinguji et al., *J. Light Wave Technology*, Vol. 13, No. 1, January 1995, pp. 73–82, for a filter using multiple fibers and couplers is applicable to the single fiber lattice filter as well. The disclosure of the Jinguji article is hereby incorporated by reference herein. For purposes of such mathematical treatment, each sensing section can be considered as providing two different paths with a shift dependent upon $\Delta\beta$ and z, whereas each spin section can be viewed as a coupler between the paths of successive stages.

Because the sensing sections are embedded in body 10, the length z of each sensing section will vary directly with a strain in the adjacent portion of the body. Thus, for each sensing section:

$$z = z_0(1+\epsilon) \quad (3)$$

where:
  $z_0$ is the length of the sensing section when the adjacent portion of body 10 is in the zero strain or undeformed state; and
  $\epsilon$ is the linear strain in that portion of the body surrounding the sensing section.

The strain those portions of body 10 surrounding any of sensing section 26, 30, 34 or 38 may also alter the value of $\Delta\beta$ to some extent. Thus:

$$\Delta\beta \approx (\Delta\beta)_0(1+\kappa\epsilon)$$

Where:
  $(\Delta\beta)_0$ is the value of $\Delta\beta$ at zero strain; and
  $\kappa$ is a constant Accordingly, the value of $\Delta\phi$ for each sensing section will vary depending upon the strain in the surrounding portion of body 10. Combining equations (2), (3) and (4):

$$\Delta\Phi \approx \frac{(\Delta\beta)_0(1+\kappa\epsilon)z_0(1+\epsilon)}{2} \quad (5)$$

Rearranging and neglecting higher-order terms, $$\Delta\Phi \approx \frac{(\Delta\beta)_0(z_0)(1+\kappa\epsilon+\epsilon)}{2} \quad (6)$$

The variations in $\Delta\phi$ of the various sensing sections will cause variations in the overall transfer function depicted in FIG. 4. For example, the transfer function may change from the function 160 shown in solid lines to the function 160' shown in broken lines in FIG. 4. The transfer function results from the effects of all of the sensing sections together. Thus, once $\Delta\phi$ is known for each sensing section, the linear strain $\epsilon$ for the associated section of the body is know.

Preferably, all of the sensing sections are of equal length z, and are otherwise identical to one another. In this case, each sensing section will have the same value of $\Delta\phi$ under zero-strain conditions. Thus, under strain conditions, the value $\Delta\phi_i$ for the $i^{th}$ sensing section is equal to:

$$\Delta\phi_i = \Delta\phi_0 + \delta\phi_i \quad (7)$$

Where $\delta\phi_i$ is the change in $\Delta\phi$ for the $i^{th}$ sensing section due to strain; and
  $\Delta\phi_0$ is the value of $\Delta\phi$ under zero-strain conditions.

The value of $\Delta\phi$ for each individual sensing sections can be deduced from the overall transfer function, which in turn can be deduced from the input and output optical power at various wavelengths. At any given wavelength:

$$P_{sout} = \psi_{sout}^* \psi_{sout} \quad (8) \text{ and}$$

$$P_{fout} = \psi_{fout}^* \psi_{fout} \quad (9)$$

Where $\psi_{sout}$ and $\psi_{fout}$ are the complex amplitudes of the light at the output end of the device. The complex amplitudes are of the form:

$$\Psi_{fout} = j\left(\sum_{k=0}^{n} b_k \overline{Z}^{-k}\right)\overline{Z}^{n/2} \quad (10)$$

and $$\Psi_{sout} = j\left(\sum_{k=0}^{n} a_k \overline{Z}^{-k}\right)\overline{Z}^{n/2} \quad (11)$$

Where:

$$\overline{Z} = e^{j\Delta\beta z} = e^{j\omega\Delta\tau} \quad (12)$$

The complex coefficients $b_k$ can be obtained from the output power $P_{fout}$ and $P_{sout}$ as explained in the text Digital Signal Processing, by A. V. Oppenhein and R. W. Schafter, Englewood Cliffs, N.J., 1975 (Prentice-Hall), the disclosure of which is also incorporated by reference herein, whereas the coefficients $a_k$ can be obtained as described in the aforementioned Jinguji article. The input power in fast and slow modes $P_{fin}$ and $P_{sin}$ is similarly related to the complex input amplitudes $\psi_{sin}$ and $\psi_{fin}$:

$$P_{sin} = \psi_{sin}^* \psi_{sin} \quad (13) \text{ and}$$

$$P_{fin} = \psi_{fin}^* \psi_{fin} \quad (14).$$

The complex input and output amplitudes are related by the matrix equation:

$$\begin{bmatrix} \Psi_{fout} \\ \Psi_{sout} \end{bmatrix} = \begin{bmatrix} \overline{\cos\theta_n} & -j\sin\theta_n \\ -j\sin\theta_n & \cos\theta_n \end{bmatrix}$$

$$\prod_i^n \left\{ \begin{bmatrix} e^{-j[\Delta\Phi_0 + \partial\Phi_i]/2} & 0 \\ 0 & e^{j[\Delta\Phi_0 + \partial\Phi_i]/2} \end{bmatrix} \begin{bmatrix} \overline{\cos\theta_i} & -j\sin\theta_i \\ -j\sin\theta_i & \cos\theta_i \end{bmatrix} \right\} \begin{bmatrix} \Psi_{fin} \\ \Psi_{sin} \end{bmatrix} \quad (15)$$

In equation (15), the angle $\theta_i$ represents the amount of power transferred between the fast and slow modes at ith spin section, i.e., at the spin section immediately following the $i^{th}$ sensing section, and n represents the number of sensing sections in the device. As pointed out above, the different spin sections are arranged to transfer different amounts of power. Therefore, the value of $\theta_i$ is different for different values of i. Matrix equation (15), evaluated at each wavelength yields several simultaneous scalar equations. The data acquired at different wavelengths will yield different values of output power at each wavelength, as both $\Delta\phi_0$ and $\delta\phi_i$ are directly related to $\Delta\beta$, and $\Delta\beta$ varies with wavelength. Evaluation of equation (15) at several wavelengths yields enough information to solve the simultaneous scalar equations, and thereby determine $\Delta\phi$ for each sensing section at each wavelength. The different values of $\theta_i$ aid in this process; they avoid ambiguities which would otherwise occur, and make it possible to determine each $\delta\phi_i$ uniquely.

The mathematical operations discussed above may be clarified by a qualitative explanation The light appearing at the output end of the device includes numerous components at different beat frequencies. The component with the highest beat frequency arises from interference between light which has traveled through all of the sensing sections along the fast axis and light which has traveled through all of the sensing sections along the slow axis. Other components with the second-highest beat frequency will arise from interference between light which has traveled through all but one sensing section along the fast axis and light which has traveled through all sensing sections along the slow axis. Components at the same beat frequency will arise from interference between light which has traveled through all but one sensing section along the slow axis and light which has traveled through all sensing sections along the fast axis. Components at other beat frequencies will arise from interference between light which has traveled through other combinations of fast and slow axes. However, there will be plural components at each beat frequency. For example, the components at the second-highest beat frequency will include one component arising from light which has traveled through only the first sensing section on the slow axis; another component arising from light which has traveled through only the second sensing section on the slow axis, and so on. By using spin sections or couplers with different degrees of coupling (different values of $\theta_i$) varying monotonically along the length of the device, these components will have different amplitudes. Thus, it is possible to isolate each component mathematically.

The process of solving above equations involves the same mathematics as used in the aforementioned Jinguji article for design of a filter. In the article, the problem posed is how to select values of $\Delta\phi$ (or of $\Delta\beta$) for multiple sections of a filter to give a desired pattern of variation in transfer function with wavelength. In the present sensor, the same mathematics is used to deduce the values of $\Delta\phi$ which gave a known pattern of variation in transfer function with wavelength. Once the value of $\Delta\phi$ for an individual sensing section has been determined, the value of $\epsilon$ for the surrounding portion of body 10 can be deduced from equation (6).

Figure 5:
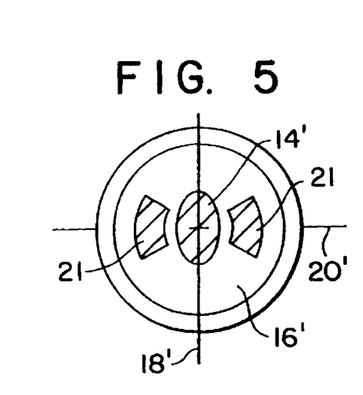
FIG. 5 is a cross-sectional view similar to FIG. 2 but depicting a fiber used in a further embodiment of the invention.

The foregoing discussion ignores the effect of temperature on the fiber. As described, for example, in the paper Truly Form Birefringent Fibers, D. Wong and S. Poole, Integrated Photonics Research, Post Deadline Papers, 1992, pp. 52–55, the disclosure of which is hereby incorporated by reference herein, some of the birefringence or difference in propagation constants between the fast and slow modes for an elliptical core fiber as described above is due to stress induces upon cooling during drawing of the fiber. The core of an elliptical-core fiber is under a greater tensile stress along its major axis than along its minor axis. This effect varies with the temperature of the fiber and hence the birefringence or $\Delta\beta$ varies with the fiber temperature. This effect can be eliminated by forming the fiber designed so that the tensile stresses along the major and minor axes are equal for the temperature range of interest. Such equal stresses can be achieved by providing holes in the cladding on both sides of the core along the major axis so as to reduce the tensile stress in the core along the major axis or by incorporating "side lobes" or stress modifying elements in the core along the minor axis to enhance the tensile stress in the core. As depicted in FIG. 5, the fiber has a circular cladding 16' of silica and an elliptical core 14' of germanium-doped silica with a major axis 18' and a minor axis 20'. The fiber has a pair of stress-modifying elements 21 formed from the same material as the core. These modifying elements induce stress along minor axis 20' and suppress temperature effects on birefringence over a wide temperature range. The fiber can be "fine tuned" by etching or otherwise adjusting the exterior shape of the preform so as to vary the shape of cladding 16' and thus vary the stress field applied by the modifying elements. Such a fiber can have essentially zero temperature sensitivity, i.e., essentially no change in A P with temperature.

Figure 6:
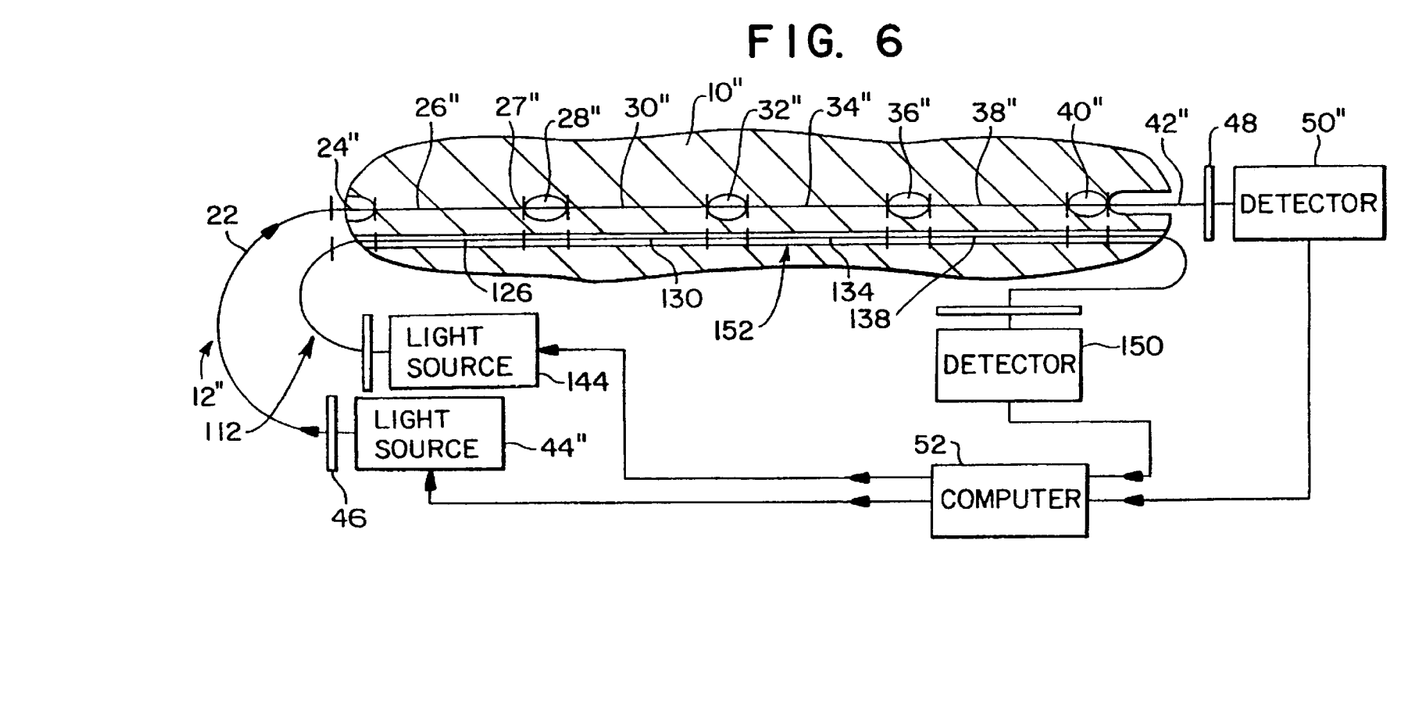
FIG. 6 is a view similar to FIG. 1 but depicting apparatus according to another embodiment of the invention.

Alternatively, an arrangement such as that depicted in FIG. 6 may be employed. The apparatus of FIG. 6 includes a measuring fiber or first fiber 12" and associated light source 44", detector 50" and other elements as described above with reference to FIG. 1. However, the apparatus of FIG. 6 also includes a compensating fiber 112 with an additional light source 144 and detector 150. Compensating fiber 112 is substantially identical to measuring fiber 12. Thus, compensating fiber 112 includes compensating sections 126, 130, 134 and 138 identical to the sensing sections of measuring fiber 12" as well as spin sections connected between these compensating sections. Compensating fiber 112 also has an input section connected to a light source 144 and an output section connected through a polarizer to a detector 150. All of these elements are substantially the same as those associated with measuring fiber 12". The compensating fiber extends through a bore 152 in body 10". Each of the compensating sections 126–138 extends alongside of one sensing section 26"–38" of the measuring fiber. However, the compensating sections are mechanically decoupled from body 10", so that deformations within body 10" are not transmitted to the compensating sections. However, because each compensating section and each sensing section are in heat-transfer relationship with the body, each compensating section will be at the same temperature as the adjacent sensing section. For example, changes in temperature in part of body 10" will affect the temperatures of sensing section 26" and of compensating section 126 in substantially the same manner.

In operation, computer 52 actuates light source 144 and detector 150 of the compensating fiber to derive a plot of the transfer function of the compensating fiber. The computer then calculates the phase difference Δφ for each compensating region of the compensating fiber and subtracts that phase difference from the phase difference for the adjacent sensing region of the measuring fiber. For example, before calculating the effect of stress on measuring fiber sensing region 26", the phase difference is corrected by subtracting the phase difference for compensating region 126.

In the embodiments discussed above, the phenomena to be sensed is stress or deformation in the body. However, sensors according to the present invention can be utilized for measuring a wide range of phenomena. For example, a fiber having birefringence or Δβ which varies with temperature can be utilized to monitor temperature. In this instance, the sensing regions of the fiber are mounted so that they are isolated from mechanical stress but are thermally linked to the medium or surroundings to be monitored. For example, where the temperature of a medium, room or industrial processes to be monitored, the sensing fiber may be mounted inside a heat conductive covering but not mechanically linked to the covering. For example, the fiber may be arranged in a bore slightly larger than the fiber so that the fiber remains isolated from expansion and contraction of the covering. The covering is then immersed within the medium to be monitored. Also, the sensing sections of a fiber can be exposed to mechanical phenomena such as acoustical vibrations or fluid pressures by linking each sensing section to a mechanical element adapted to receive such mechanical phenomena. For example, to sense pressure at a plurality of locations, each sensing region of the fiber may be connected to a separate diaphragm. Each such diaphragm may be exposed to a separate source of fluid pressure. Likewise, a plurality of acoustical phenomena can be sensed by connecting each sensing section of the fiber to a separate body and mounting each such separate bodies at a separate location for receipt of acoustical vibrations. Similarly, numerous weights or accelerations can be sensed by mounting the separate sensing sections to separate deformable bodies such as springs or beams loaded by the weights or accelerations to be sensed. In each case, each sensing section should be mounted so that strain in the associated body will be transmitted to the fiber and the fiber will deform along with the body. This can be done by embedding the fiber within the body as discussed above during manufacture of the body or, alternatively, by bonding the sensing region of the fiber to the body. Alternatively, the sensing section of the fiber may encircle the body. For example, where the body is a cylindrical pressure vessel, the sensing region or regions of the regions of the fiber may encircle the pressure vessel so at the same will be stretched when the pressure vessel expands under internal pressure. Essentially any mechanical arrangement which causes deformation of a body or movement of one body with respect to another, and which transmits such deformation or movement to the fiber sensing region can be employed.

Figure 7:
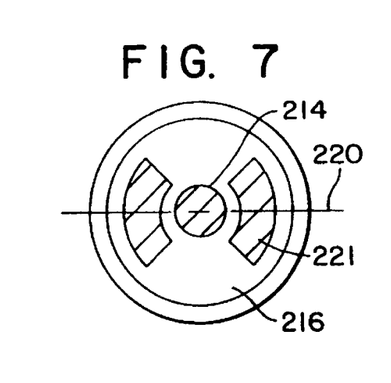
FIG. 7 is a further cross-sectional view depicting a fiber used in yet another embodiment of the invention.

An alternative fiber configuration is depicted in FIG. 7. This fiber configuration utilizes a circular core 214 embedded in a cladding 216, and a pair of modifying elements 221 embedded in the cladding along one axis 220 transverse to the length of the fiber. Modifying elements 221 induce stress in cladding 216 along axis 220 and hence induce stress birefringence in core 214. The fiber thus is sensitive both to stress and to temperature in the same manner as the plain elliptical fiber discussed above with reference to FIG. 2. Such a fiber can be used either in a compensated sensing arrangement as discussed above with reference to FIG. 6 or in a temperature sensing device.

In the arrangements discussed above, the sensing regions and spin regions follow one another in unbroken sequence. However, the apparatus may include additional sections of fiber intervening between these regions. For example, an additional length of polarization maintaining fiber may be incorporated between a sensing region and a spin region. Alternatively, an additional length of polarization maintaining fiber may be inserted within the middle of a spin region or within the middle of a sensing region. Provided that these added idle lengths are isolated from the phenomena to be sensed, they simply add fixed phase delays to the transfer function of the system This effect can be canceled out in the deconvolution process used to derive the individual phase shift for the sensing regions. Thus, the sensing regions of the fiber can be spaced apart from one another as desired along the length of the fiber.

Figure 8:
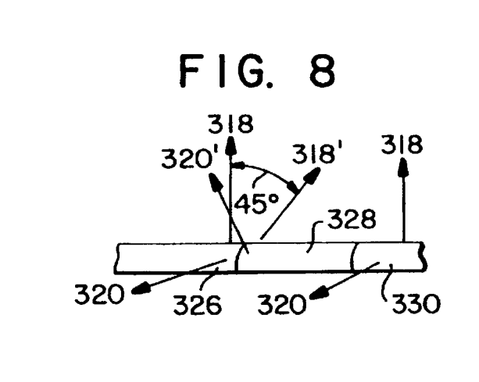
FIG. 8 is a diagrammatic perspective view depicting a portion of apparatus according to yet another embodiment of the invention.

As shown in FIG. 8, the spin regions can be replaced by splices in which successive regions of polarization maintaining fiber have their fast and slow axes rotated with respect to one another. Preferably, the fast axes of successive sections joined at each such splice are oblique to one another. For example, alternate sensing sections may have oppositely-directed spins. In a transition region at the splice between these sensing sections, the spin rate changes rapidly, and mode coupling occurs. Thus, as shown in FIG. 8, a sensing section 326 having fast and slow axes 320 and 318 is spliced to a coupling section 328 having fast and slow axes 320' and 318' are disposed at 45° to the corresponding axes of section 326. The coupling section in tun is spliced to the next sensing section 330 and the fast and slow axes of section 330 are at 45° to the fast and slow axes of coupling fiber 328. Here again, the light passing along fiber 326 in the slow mode (polarized on axis 318) will be coupled into both of the fast and slow modes in fiber 328. Likewise, the light propagated in the fast mode in fiber 326 (polarized on fast axis 320) will be coupled into both fast and slow modes in fiber 328. Therefore, the light propagated into the slow mode in fiber 328 will be a mixture of the light propagated in fast and slow modes in fiber 326 and the light propagated in the fast mode in fiber 328 will also be a mixture of the light propagated in fast and slow modes in fiber 326. The combined light propagated in the slow mode in fiber 328 (with its polarization aligned with slow axis 318') will be launched into both fast and slow modes in fiber 330. Similarly, the combined light in the fast mode (axis 320') will also be launched into both fast and slow modes in fiber 320. The effect is similar to that achieved by the inter-mode mixing in a spin section as discussed above. However, where the couplers between sensing sections are splices rather than spin sections, the mathematical treatment taught in the article Optical Network Synthesis Using Birefringent Crystals, v. Synthesis of Lossless Networks Containing Equal-Length Crystals and Compensators, J. Optical Society of America, Vol. 56, No. 12, pp. 1746–1754 (1966), the disclosure of which is hereby incorporated by reference herein, may be used.

Figure 9:
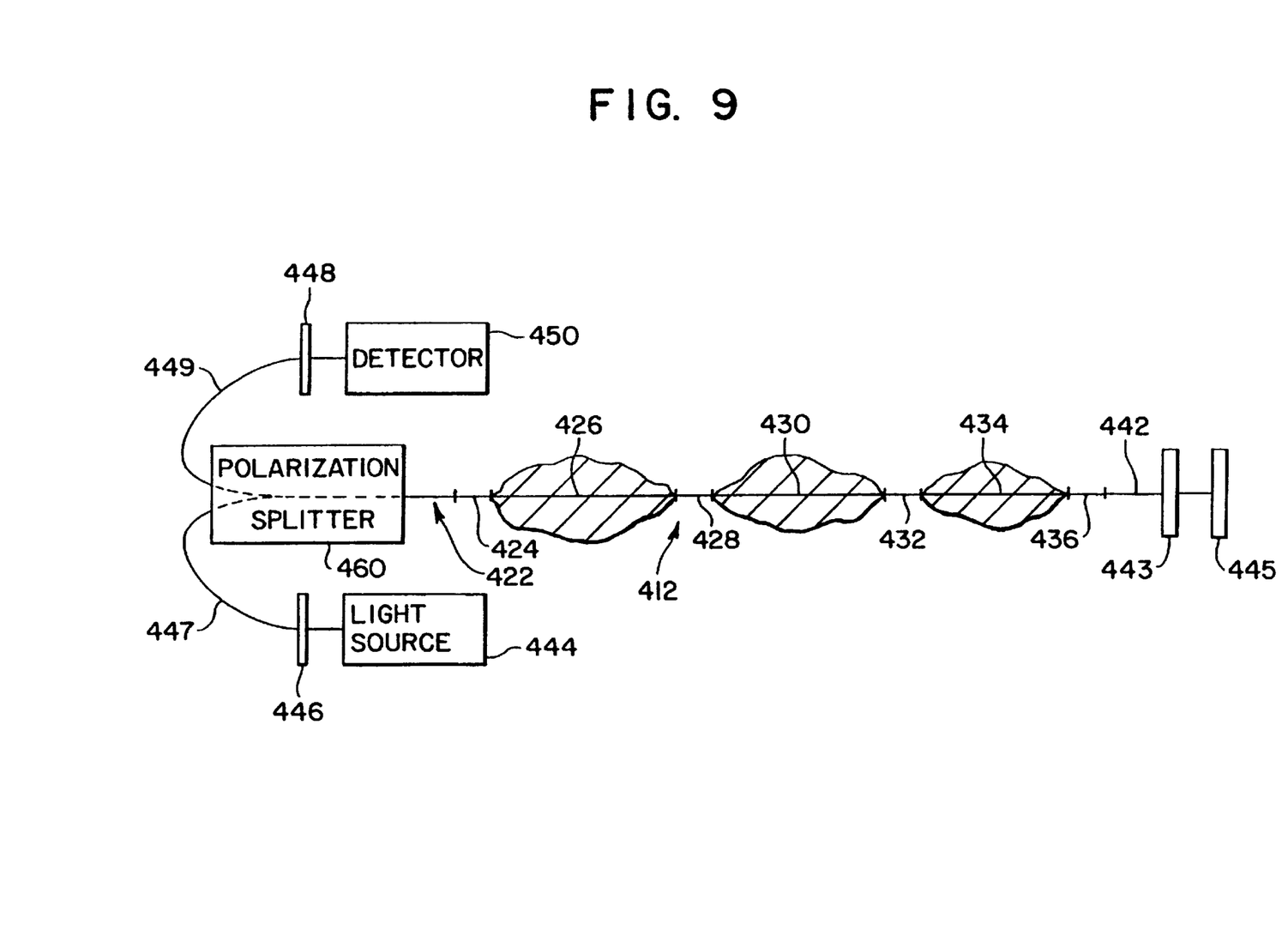
FIG. 9 is a view similar to FIG. 1 but depicting apparatus according to yet another embodiment of the invention.

The apparatus depicted in FIG. 9 is arranged to operate with reflected light. This apparatus includes a unitary fiber 410 similar to the unitary fiber discussed above with reference to FIG. 1. Thus, fiber 410 includes a polarization-maintaining first section 422 of constant spin rate serving as an input fiber; a polarization-maintaining last section 442 of constant spin rate serving as an output fiber; a series of polarization-maintaining sensing sections 426, 430 and 434 of constant spin rate; and a plurality of spin sections 424, 428, 432 and 436. Here again, within each spin section the spin rate varies along the length of the fiber, so that within each spin section light is coupled between the polarization modes. The spin sections are arranged in alternating sequence with the sensing sections, so that spin sections are provided at opposite ends of each sensing section. Thus, spin section 424 is connected between the input section or fiber 422 and the input end of the first sensing section 426, whereas spin section 428 is connected between the output end of sensing section 426 and the input end of the next sensing section 430, and so on until the last spin section 436, which connects the ouput end of the last sensing section 434 to output fiber or section 442. Most preferably, different spin sections are arranged to provide different degrees of coupling between polarization modes.

Input section 442 is coupled to a polarization-sensitive splitter 460. Splitter 460 is connected by a polarization-maintaining fiber 447 to a light source 444, which is equipped with a polarization filter 446 so that the source provides light polarized in a first direction. Splitter 460 is also connected through a polarization-maintaining fiber 449 to a detector 450 equipped with a father polarization filter 448 adapted to pass only light having polarized in a second direction orthogonal to the first direction. Splitter 460 is arranged to pass light polarized in the first direction from fiber 447, and hence from source 444, into input fiber 422, but to divert light from input fiber 422 polarized in the second direction through fiber 449 to detector 450. The output section 442 is coupled through a further polarization filter 443 to a mirror 445. Filter 443 has a polarization direction which is fixed relative to the polarization directions of the other filters. Preferably, filter 443 is arranged to pass light polarized in the first direction. Mirror 445 is arranged to reflect light passing through output section 442 and filter 443 back along the fiber in the reverse direction, through the output section and through the various spin sections and sensing sections back to input section 422.

Apparatus according to this aspect of the present invention operates in substantially the same manner as discussed above. Once again, sensing sections 426, 430 and 434 are exposed to the phenomenon to be sensed in the ways discussed above. However, each stage of the apparatus acts on the light twice: once as the light travels in the forward direction, from input fiber to output fiber, and once as the light travels in the reverse direction. The functions of the spin sections are reversed for light traveling in the reverse direction. For example, spin section 424 launches forwardly-traveling light into both polarization modes of sensing section 426, and spin section 428 combines light in propagated in section 426 into common modes. With respect to light traveling in the reverse direction, spin section 428 launches the light into section 426, whereas spin section 424 combines the light propagated in section 426 into common modes.

Numerous other variations and combinations of the features discussed above cam be utilized without departing from the present invention as defined by the claims. Accordingly, the foregoing description of the preferred embodiment should be taken by way of example, rather than by way of limitation of the present invention.

What is claimed is:

1. Optical sensing apparatus for sensing a plurality of phenomena, the apparatus including a plurality of stages connected in series order from a first stage to a last stage, each said stage comprising:

(a) a polarization-maintaining sensing fiber having different propagation constants for light in first and second polarization modes, said sensing fiber having input and output ends;

(b) launching means for launching light in both of said polarization modes into said sensing fiber at said input end, whereby light will propagate in both of said polarization modes to the output end;

(c) combining means for combining light propagated to the output end of the sensing fiber in both of said polarization modes into one or more common polarization modes, whereby the amplitude of the combined light will vary with the phase relationship between the light propagated in the first mode and the light propagated in the second mode at the output end of the fiber; and (d) exposure means for mounting the sensing fiber so that the sensing fiber is exposed to a phenomenon to be sensed and so that such phenomenon will alter the length of the sensing fiber, the difference between said propagation constants, or both, whereby said phase relationship and said amplitude will vary with the phenomenon to be sensed, the combining means of each stage other than the last stage being connected to the launching means of the next stage in said series so that combined light from each said stage other than the last stage in the series will be launched into the sensing fiber of the next stage in the series.

2. Apparatus as claimed in claim 1 wherein said exposure means of each stage includes means for securing the sensing fiber to an object so that deformation of said object will alter the length of said fiber.

3. Apparatus as claimed in claim 2 wherein said sensing fibers are embedded in said object.

4. Apparatus as claimed in claim 1 wherein the difference between said propagation constants of each said sensing fiber vanes with temperature and said exposure means of each stage includes means for mounting the fiber in heat-transfer relationship with a body or medium having a temperature to be sensed.

5. Apparatus as claimed in claim 1 further comprising means for detecting the amplitude of the combined light provided by said combining means of the last stage.

6. Apparatus as claimed in claim 5 wherein said means for detecting amplitude includes a polarization-maintaining output fiber connected to the combining means of the last stage, a polarizing filter connected to said output fiber and a detector arranged to detect light passing through said filter.

7. Apparatus as claimed in claim 1 wherein each said sensing fiber has a non-circular core embedded in a cladding.

8. Apparatus as claimed in claim 1 wherein each said sensing fiber includes a core embedded in a cladding, said cladding having a region of non-circular symmetry providing a non-circular stress.

9. Apparatus as claimed in claim 1 wherein said launching means of said first stage includes a polarization-maintaining input fiber having an input end and an output end coupled to the input end of the sensing fiber of the first stage so that light propagating in one polarization to said input fiber will be coupled from the input fiber into both polarization modes in the sensing fiber of the first stage, and a light source arranged to provide light in only one polarization to the input end of said input fiber.

10. Apparatus as claimed in claim 9 wherein said output end of said input fiber is coupled to the input end of the sensing fiber by a splice.

11. Apparatus as claimed in claim 9 wherein said input fiber and said sensing fiber of said first stage are parts of a single continuos polarization mode maintaining fiber, and wherein said input fiber is coupled to the sensing fiber by a spin section in the continuous fiber.

12. Apparatus as claimed in claim 1 further comprising a mirror connected to the combining means of the last stage for reflecting light back through the stages in reverse sequence from the last stage to the first stage, said combining means and launching means of each said stage being bidirectional so that the combining means of each stage serves as launching means for launching reflected light in both polarization modes of the sensing fiber of such stage into the fiber at the output end thereof and so that the launching means of each stage serves to combine reflected light propagated to the input end of the sensing fiber in both of such polarization modes into one or more common polarization modes, the apparatus further comprising a polariizing filter connected between said mirror and said output means of said last stage.

13. Apparatus as claimed in claim 12, wherein said launching means of said first stage includes a polarization-maintaining input fiber having an input end and an output end coupled to the input end of the sensing fiber of the first stage so that light propagating in one polarization in said input fiber will be coupled from the input fiber into both polarization modes in the sensing fiber of the first stage, and a light source connected to the input end of the input fiber, said light source being arranged to provide light having a first polarization to said input end of said input fiber, the apparatus further comprising a detector coupled to the input end of said input fiber for detecting reflected light, said detector being arranged to detect light having a second polarization orthogonal to the first polarization.

14. Apparatus as claimed in claim 1 wherein each said sensing fiber has length at least about 10 times the beat length of the sensing fiber, wherein the beat length of the sensing fiber is given by the equation:

$$L_B = \frac{2\pi}{\Delta\beta}$$

wherein:

$L_B$ is the beat length of the sensing fiber; and $\Delta\beta$ is the difference between said propagation constants of said sensing fiber.

15. Apparatus as claimed in claim 14 wherein each said sensing fiber has a length between about 10 and about 100 times said beat length.

16. Apparatus as claimed in claim 1 wherein said launching means, said combining means and said sensing fibers of all of said stages are formed as sections of a single continuous polarization maintaining fiber, said combining means of each stage including a spin section of said fiber, each said spin section also constituting the launching means of the next stage.

17. Apparatus as claimed in claim 16 wherein each said spin section of said fiber includes regions having oppositely-directed spins.

18. Apparatus as claimed in claim 17 wherein said spin sections of different stages are arranged to provide different degrees of coupling between the polarization modes.

19. Apparatus as claimed in claim 18 wherein the degree of mode coupling between polarization modes provided by said spin sections varies monotonically from said first stage to said last stage.

20. Apparatus as claimed in claim 1 wherein said launching means, said combining means and said sensing fibers of all of said stages are formed as sections of fibers spliced end to end.

21. Apparatus as claimed in claim 1 wherein said combining means of different stages are arranged to provide different degrees of coupling between the polarization modes.

22. Apparatus as claimed in claim 21 wherein the degree of coupling between polarization modes provided by said combining means varies monotonically from said first stage to said last stage.

23. Apparatus as claimed in claim 1 further comprising light supply means for supplying light at a plurality of wavelengths to the input means of the first stage in the series.

24. Apparatus as claimed in claim 23 further comprising means for detecting the amplitude of light at the combining means of the last stage in the series and means for actuating said light-supplying means and said detecting means so as to provide data constituting a plot of detected amplitude versus wavelength of supplied light.

25. Apparatus as claimed in claim 24 further comprising means for deconvoluting said data so as to derive a separate measurement of the condition to be sensed for each said stage.

26. Apparatus as claimed in claim 1 wherein said exposure means includes means for connecting the sensing fiber of each said stage to a different portion of an object so that deformation of each portion of the object will induce stress in the sensing fiber connected to that portion of the object.

27. Apparatus as claimed in claim 26 wherein said sensing fibers are embedded in the object.

28. A unitary fiber including a polarization-maintaining sensing section having a uniform spin rate and having different propagation constants for light in first and second polarization modes, said sensing section having input and output ends, the unitary fiber further including a plurality of spin sections wherein the spin rate varies along the length of the fiber within each spin section, a first one of said spin sections being connected to the input end of the sensing section, a second one of said spin sections being connected to the output end of said sensing section whereby light supplied to said first spin section will be coupled into both polarization modes of said sensing section and light propagated along said sensing section in both polarization modes will be combined in one or more common modes in said second spin section.

29. A fiber as claimed in claim 28 including at least two sensing sections as aforesaid and at least three spin sections as aforesaid, said spin sections and said sensing sections being arranged in alternating sequence along the length of the fiber.

30. A fiber as claimed in claim 29 wherein different ones of said spin sections are arranged to provide different degrees of coupling between polarization modes.

31. A method of sensing a plurality of phenomena comprising the steps of (a) directing light at a plurality of wavelengths through a series of stages each including a polarization-maintaining sensing fiber having different propagation constants for light in the first and second polarization modes and a combiner for combining light propagated to an output end of the sensing fiber in both of said polarization modes into combined light of a single polarization mode, so that the light is launched into the sensing fiber of the first stage in both polarization modes and so that the combined light from each stage is launched into the sensing fiber of the next stage in both polarization modes until the light reaches the combiner last stage; and (b) exposing the sensing fiber of each stage to a phenomenon to be sensed so that such phenomenon to be sensed will alter the length of the sensing fiber, the difference between the propagation constants of such fiber, or both, whereby a relationship between wavelength of light and the amplitude of the combined light from the last said stage will vary with all of the phenomena to be sensed.

32. A method as claimed in claim 31 further comprising the steps of detecting the amplitude of the combined light from the last stage, collecting data constituting a plot of such amplitude versus wavelength and deconvoluting said data so as to derive a separate measurement of the phenomenon sensed by the sensing fiber of each said stage.

33. A method as claimed in claim 31 wherein said step of exposing said sensing fibers of said stages to phenomena to be sensed includes the step of securing said sensing fibers to different portions of an object so that of each portion of the object will induce stress in the sensing fiber connected to that portion of the object.

34. A method as claimed in claim 33 wherein said sensing fibers are embedded in said object.

35. A method as claimed in claim 31 further comprising the step of compensating for an effect of temperature on said sensing fibers.

* * * * *

UNITED STATES PATENT AND TRADEMARK OFFICE
CERTIFICATE OF CORRECTION

PATENT NO. : 6,211,962 B1
DATED : April 3, 2001
INVENTOR(S) : Daniel A. Nolan

It is certified that error appears in the above-identified patent and that said Letters Patent is hereby corrected as shown below:

Column 16,
Line 34, "vanes" should be -- varies --

Column 17,
Line 8, "bidirectional" should be -- bi-directional --
Line 11, "thereof" should be -- thereof, --
Line 16, "polariizing" should be -- polarizing --

Signed and Sealed this

Eleventh Day of December, 2001

Attest:

NICHOLAS P. GODICI
*Attesting Officer*     *Acting Director of the United States Patent and Trademark Office*